United States Patent [19]

Hetrick

[11] 4,171,608
[45] Oct. 23, 1979

[54] SAFETY ATTACHMENT FOR LAWN MOWERS

[76] Inventor: Glenn C. Hetrick, 2045 E. Parkway Dr., Altoona, Pa. 16602

[21] Appl. No.: 853,045

[22] Filed: Nov. 21, 1977

Related U.S. Application Data

[63] Continuation-in-part of Ser. No. 729,113, Oct. 4, 1976, abandoned.

[51] Int. Cl.² .................................................. A01D 55/18
[52] U.S. Cl. ................................................................. 56/295
[58] Field of Search ................................. 56/295, 17.4

[56] References Cited

U.S. PATENT DOCUMENTS

| | | | |
|---|---|---|---|
| 2,859,581 | 11/1958 | Kroll et al. | 56/295 |
| 3,097,469 | 7/1963 | Belfiore | 56/295 |
| 3,283,488 | 11/1966 | Franklin | 56/295 |
| 3,327,460 | 6/1967 | Blackstone | 56/295 |
| 3,399,519 | 9/1968 | Buchanan | 56/295 |
| 3,420,043 | 1/1969 | Hershey | 56/295 |
| 3,534,534 | 10/1970 | Raiti | 56/295 |
| 3,805,502 | 4/1974 | Herter | 56/295 |

FOREIGN PATENT DOCUMENTS 2327356  1/1975  Fed. Rep. of Germany ............. 56/295

*Primary Examiner*—Jay N. Eshovitz
*Attorney, Agent, or Firm*—Morse, Altman, Oates & Bello

[57] ABSTRACT

A safety attachment is provided for use with a rotary lawn mower to prevent substantial injury to anyone whose extremity may accidentally strike the cutter. The attachment includes a relatively large annular disc mounted to the drive shaft of the motor for rotation about a vertical axis and at least one cutter bar mounted diametrically across the disc on the underside thereof. The disc diameter is substantially equal to the length of the cutter bar. In one embodiment slots are provided adjacent to the leading edges of the cutter bar and impellers are provided on the upper side of the disc adjacent the slot for discharging cut grass through the side of the machine. The combination of the disc and the cutter bar provides good grass cutting action and at the same time greatly reduces the risk of serious injury in the event that one's foot, for example, accidentally slips in under the mower.

8 Claims, 12 Drawing Figures

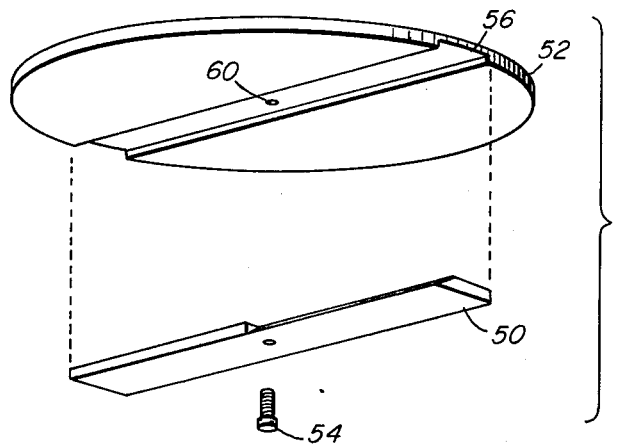
FIG. 8
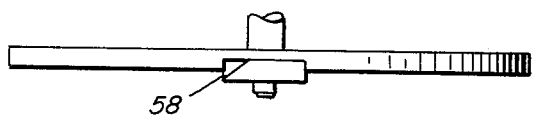
FIG. 9
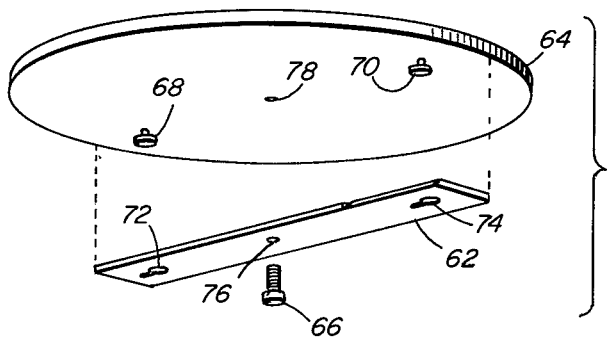
FIG. 10
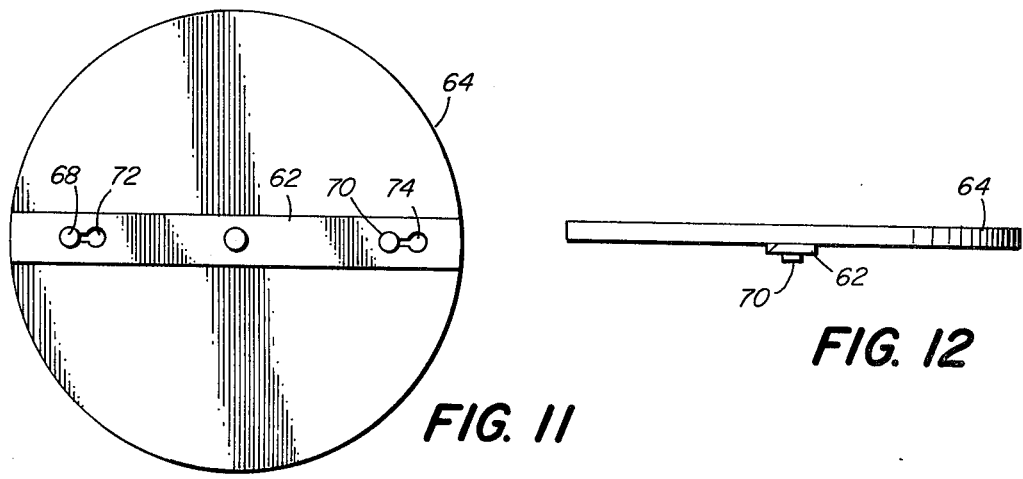
FIG. 11
FIG. 12

SAFETY ATTACHMENT FOR LAWN MOWERS

CROSS-REFERENCE TO RELATED APPLICATION

This is a continuation-in-part of abandoned application Ser. No. 729,113, filed Oct. 4, 1976, entitled "Safety Attachment for Lawn Mowers".

BACKGROUND OF THE INVENTION

1. Field of the Invention

This invention relates generally to rotary lawn mowers and more particularly is directed towards a new and improved safety attachment for rotary lawn mowers.

2. Description of the Prior Art

Rotary lawn mowers are becoming increasingly more popular as compared to reel type lawn mowers primarily for the reason that rotary lawn mowers are mechanically simpler, generally less expensive, lighter and easier to service than a reel type lawn mower. Despite the many advantages of the rotary type lawn mower, it is somewhat dangerous to use because the cutting blade rotates at a high speed and serious injuries frequently occur as the result of persons accidentally or negligently getting their foot or hand in under the lawn mower while it is operating. The high speed blade can easily sever a finger or toe even through work shoes.

While various devices have been developed heretofore to prevent injuries of this type by rotary lawn mowers, none of them has been entirely satisfactory from the standpoint of effectiveness, simplicity, ease of maintenance and other factors.

Accordingly, it is an object of the present invention to provide a new and improved safety attachment for rotary lawn mowers. Another object of this invention is to provide a simple, low-cost safety attachment for lawn mowers which is quickly and easily installed and may be provided as original equipment or as an attachment for existing lawn mowers. Another object of this invention is to provide a safety cutter assembly for a rotary lawn mower in which a single cutting bar may provide fresh cutting edges by simply changing the position of the bar.

SUMMARY OF THE INVENTION

This invention features a safety attachment for rotary type lawn mowers comprising an annular disc mountable to the lower end of the drive shaft of the mower motor and a cutter bar having a length substantially equal to the diameter of the disc mounted flush against the disc diametrically across the underside thereof. In one embodiment the disc is provided with slots adjacent the leading edges of the cutter bar and air scoops are provided on the upper side of the disc proximate to the slots to discharge grass cuttings from the side of the machine. The cutter bar is rectangular in cross section and has four cutting edges which may be brought to bear by changing the position of the bar.

BRIEF DESCRIPTION OF THE DRAWINGS

FIG. 8 is an exploded perspective view showing yet another modification of the invention, FIG. 9 is a view in side elevation thereof, FIG. 10 is an exploded perspective view showing still another modification of the invention, FIG. 11 is a bottom plan view thereof, and, FIG. 12 is a view in side elevation thereof.

DETAILED DESCRIPTION OF THE PREFERRED EMBODIMENTS

Figure 5:
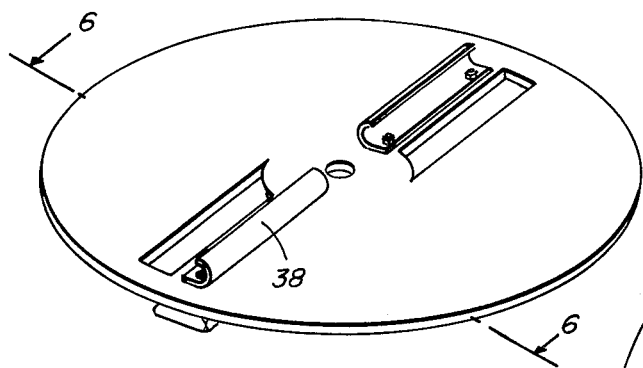
FIG. 5 is a view in perspective showing a modification of the attachment.

Referring now to the drawings, the reference character 10 generally indicates a rotary lawn mower comprised of a housing 12 mounted on wheels 14 and directed by a handle 16. A motor 18, either gasoline or electric, is mounted on top of the housing, and its drive shaft 20 extends down through the top of the housing to rotate a safety cutter attachment 22 at a high speed about a vertical axis. The housing 12 is entirely open across its bottom and the grass is cut by the rotating cutter attachment 22 to a height determined by the position of the wheels 14.

The safety cutter attachment 22, according to the invention, is comprised of an annular disc 24 mounted coaxially to the lower end of the drive shaft 20 and a cutter bar 26 mounted diametrically across the lower face of the disc 24. The diameter of the disc 24 should not be less than the length of the cutter bar and preferably the disc diameter and cutter bar length are substantially equal so that the peripheral edge of the disc 24 is substantially even with the ends of the cutter bar 26.

The disc 24 is relatively stiff and may be fabricated from a variety of materials, such as aluminum, fiberglass, suitable high impact plastics, or other materials which are relatively stiff, tough and will not shatter. The diameter of the disc is made to match the length of the cutter bar which the mower housing is designed to accommodate. By way of example, for a standard size 18" rotary lawn mower, a disc 18" in diameter is employed. The disc may have a thickness of perhaps ¼" if fabricated from aluminum, magnesium or the like, or may be thinner if fabricated from steel. The cutter bar 26 has a length of 18" and is fastened diametrically across the lower face of the disc as by ¾" bolts 28 threaded into nuts 30 and spaced diametrically across the disc. Typically, four such nuts and bolts are sufficient to hold the cutter bar 26 flat against the face of the disc. The disc, together with the cutter bar, commonly are mounted to the drive shaft 20 by means of a nut 32 engaging the threaded lower end of the drive shaft.

Preferably, the cutter bar is made of steel to provide a long lasting cutting edge. Typically the cutter bar may be perhaps 2" wide by ¼" thick, although these dimensions obviously may be varied. While the forward and leading edges of the cutter bar may be tapered to provide an acute angle cutting edge, it has been found that the cutter bar works effectively if the cutter bar is a true rectangle in cross-section so that the leading and trailing edges are perpendicular to the upper and lower faces of the cutter bar. Using a cutter bar of rectangular cross-section, it is possible to use the bar for a much longer period between sharpenings than would otherwise be the case. Since only the leading lower corners of the cutter bar become worn when the lawn mower is in use, it is possible to detach the cutter bar from the disc and by turning the bar appropriately and remounting it, a fresh, sharp cutting edge may be brought to bear. All four corners of the cutter bar may thus be put to use before it becomes necessary to remove the cutter bar and sharpen it. In practice, the outer ends of the cutter bar should be slightly rounded, particularly at the corners, to reduce the risk of serious injury by that portion of the attachment in the event that a person comes in contact with the device.

While it has been found that a flat, imperforate disc and cutter bar assembly will cut grass, the cutting action is greatly improved by forming slots 34 through the disc directly above and in advance of the leading edge of the cutter bar. The slots typically may be ½" wide and 7" in length and serve to provide an air flow up through the disc. This air flow helps to raise the blades of grass so that they will be trimmed to the same height by the cutter bar as it rotates with the disc.

Figure 6:
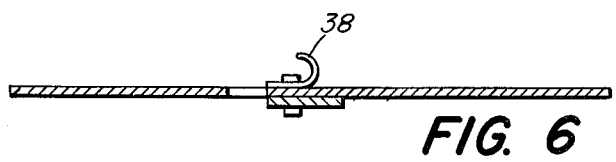
FIG. 6 is a cross-sectional view taken along the lines 6—6 of FIG. 5.

The air flow is further enhanced and the discharge of the grass out through the side of the mower is aided by means of fan blades 36 on top of the disc extending lengthwise of the slots 34 behind the trailing edges thereof. The blades preferably are in the form of concave, semi-cylindrical segments which may be formed integral with the disc as by stamping the segments out of the disc to form the slots. Alternatively, the blades may be formed by tubing sectors 38, as suggested in FIGS. 5 and 6, and mounted diametrically along the top of the disc by means of the same nuts and bolts that mount the cutter bar. The width of the blades might be on the order of perhaps ½" or so and provide sufficient fanning action to discharge the cut grass out the side chute of the mower.

Figure 1:
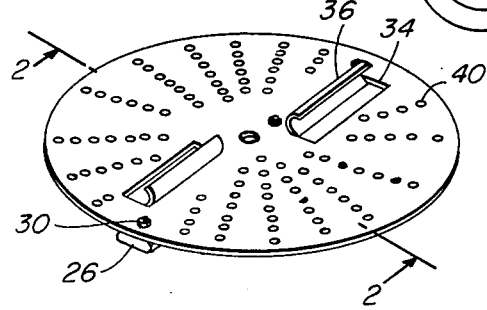
FIG. 1 is a view in perspective of a safety attachment for a rotary type lawn mower made according to the invention.
Figure 2:
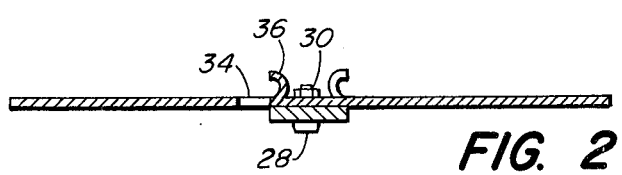
FIG. 2 is a cross-sectional view taken along the lines 2—2 of FIG. 1.

In order to reduce the weight of the disc and aid in the air flow, the disc may be formed with a number of perforations 40 which might be arranged in radial array as shown in FIG. 1.

Figure 7:
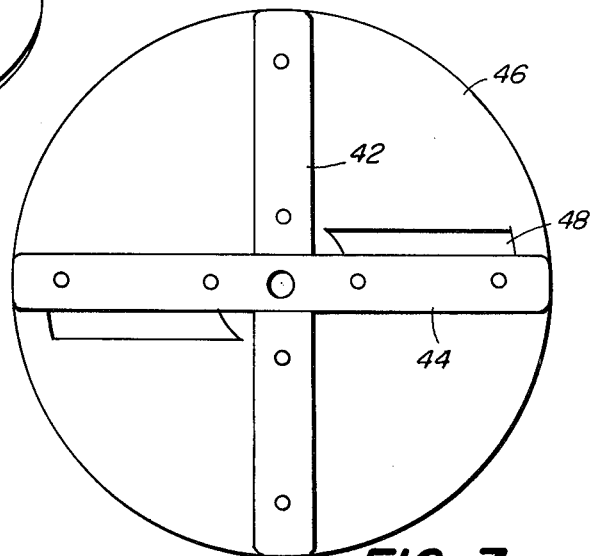
FIG. 7 is a bottom plan view showing a further modification of the invention.
Figure 4:
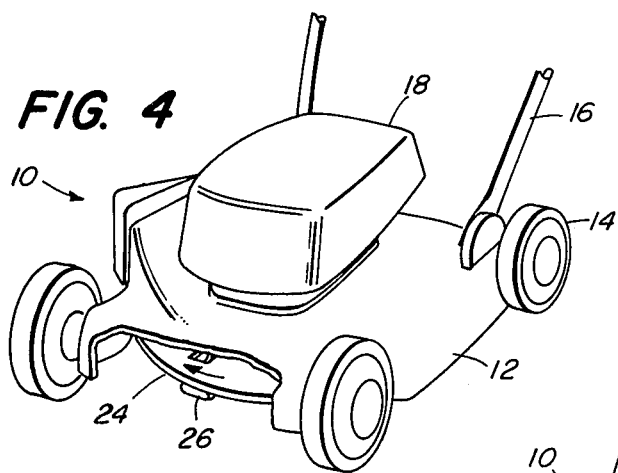
FIG. 4 is a view in perspective, partially broken away, of a lawn mower equipped with the attachment.
Figure 3:
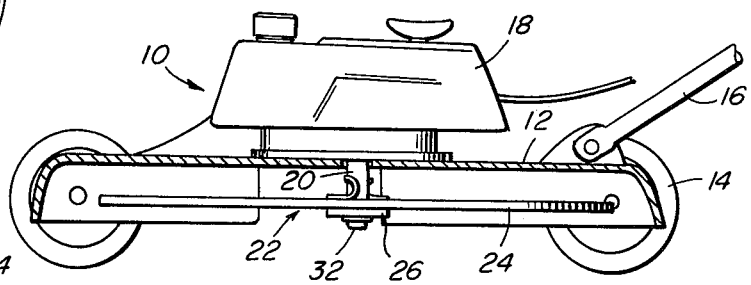
FIG. 3 is a sectional view in side elevation showing the attachment mounted to a standard rotary lawn mower.

Referring now to FIG. 7 of the drawings, there is illustrated a further modification of the invention and in this embodiment cutter bars 42 and 44 are arranged in a cross at right angles to one another. The cutter bars thus provide four active cutting edges to improve the cutting action of the attachment. Each of the cutter bars is adapted to be inverted and reversed so that a fresh cutting edge may be brought to bear four times for each cutter bar before it becomes necessary to sharpen the cutters. As before, the cutters are mounted to the bottom face of the disc 46, the diameter of which corresponds with the lengths of the cutters. As before, the disc is formed with slots 48 directly above the leading edges of the cutter bars. Fan blades similar to those described in conjunction with the principal embodiment may also be employed on the upper face of the disc.

Referring now to FIGS. 8 and 9 of the drawings, there is illustrated another modification of the invention and in this embodiment a straight, standard cutter bar 50 is secured to the underside of a disc 52 by means of a standard bolt 54. The disc 52 has a diameter substantially corresponding to the length of the cutter bar and is formed with a diametrical groove 56 of a width corresponding to the width of the cutter bar and of a depth somewhat less than the thickness of the cutter bar so that the bar, when mounted in the groove and fastened to the drive shaft of the motor, will appear as is shown in FIG. 9 with its leading cutting edge 58 extending below the bottom surface of the disc. By forming a groove in the disc and locating the cutter bar within the groove, there will be no relative movement between the cutter bar and the disc when the machine is operated.

In this embodiment the disc may be solid throughout, with the exception of a central opening 60 through which the bolt passes. The assembly provides a good cutting action and a simple means for locking the blade to the disc. It has been found that it is not necessary for the grass to extend up above the cutting edge in order to produce a cutting action and, in practice, the device of FIGS. 8 and 9 works well in mowing wet grass and high weeds and tends to keep itself in a very clean condition. Because of the solid nature of the disc, the mower continues at substantially the same speed and does not hesitate even in the thickest of grass or high weeds. In a conventional rotary mower, on the other hand, deep grass must be cut very slowly to prevent stalling the machine, and using the solid disc, the grass tends to lay down somewhat and then is cut. Since the grass does not extend up across the full face of the cutter bar, it has also been found that the cutting edge tends to remain much sharper for longer periods of time than a conventional blade.

Referring now to FIGS. 10, 11 and 12, there is illustrated yet another modification of the invention, and in this embodiment a straight cutter bar 62 is connected to a solid disc 64 by means of a bolt 66 passing through the center of the cutter bar and the disc. The cutter bar and disc are locked against relative movement by means of a pair of spaced studs 68 and 70 extending from the bottom face of the disc and engaging the cutter bar 62 through keyhole openings 72 and 74 formed near opposite ends of the cutter bar. The cutter bar is connected to the disc by placing the bar so that the heads of the studs pass through the larger ends of the keyhole openings, in which position the bar will be slightly offset. The bar is then placed flush against the surface of the disc and slipped sidewise so that the smaller portions of the keyhole openings pass in under the heads of the studs with the center opening 76 of the cutter bar and the center opening 78 of the disc now in alignment. The bolt 66 is then installed and connected to the drive shaft of the mower. The assembly has operating characteristics similar to the device of FIGS. 8 and 9, and the disc is easily separated from the cutter bar to periodically service the bar or replace it as required.

In the event that a person, such as the operator pushing the lawn mower, accidentally places his foot under the housing he will not be seriously injured by the attachment by virtue of the disc preventing the foot from coming into the full path of the cutters. It has been found that, in such cases where the foot does accidentally move in under the mower, some scuffing of the shoe occurs but no serious injury is done to the foot.

While the invention has been described with particular reference to the illustrated embodiments, numerous modifications thereto will appear to those skilled in the art.

Having thus described the invention, what I claim and desire to obtain by Letters Patent of the United States is:

1. A safety attachment for a rotary lawn mower having a motor and a drive shaft mounted thereto, comprising:
   a generally rigid disc mountable to the lower end of said shaft, the underside of said disc presenting a substantially flat, smooth continuous surface and the periphery thereof presenting a smooth, continuous substantially circular edge; and
   a cutter bar having substantially planar upper and lower surfaces and being detachably mounted diametrically across and with said upper surface directly flushly against the underside surface of said disc over substantially the full upper surface of the bar, the length of said cutter bar being substantially equal to the diameter of said disc with the ends of said bars being substantially even with the peripheral edge of said disc, said cutter bar being rectangular in cross-section, each longitudinal edge of said bar providing a cutting edge when in cutting position with respect to said disc, the cutting position of each longitudinal edge being that position occupied by said longitudinal edge when disposed at a lower forward edge of said bar relative to the direction of rotation of said disc and said bar, the bar acting in a horizontal cutting plane to cut material brought into contact therewith.

2. A safety attachment, according to claim 1, including at least a second cutter bar diametrically and detachably mounted to and directly flat against the lower face of said disc and intersecting said first bar.

3. A safety attachment, according to claim 1, wherein the bar is straight.

4. A safety attachment, according to claim 1, and further comprising releasable connecting means for detachably mounting said bar to said disc.

5. A safety attachment for a rotory lawn mower having a motor and drive shaft mounted thereto, comprising:
   a disc mountable to the lower end of said shaft, the underside of said disc presenting a substantially planar, continuous surface with the periphery of the disc presenting a continuous substantially circular edge;
   a cutter bar mounted diametrically across the underside of said disc, full upper surfaces of the cutter bar being mounted flushly against the underside surface of said disc, a lower forward edge of said bar acting in a horizontal cutting plane to cut material brought into contact therewith, the length of said cutter bar being substantially equal to the diameter of said disc with the ends of said bar being substantially even with the peripheral edge of said disc; and
   releasable connecting means for detachably mounting said bar to said disc.

6. A safety attachment, according to claim 5, wherein said connecting means includes a groove formed diametrically across the underside of said disc, said groove having a depth less than the thickness of said bar.

7. A safety attachment, according to claim 5, wherein said connecting means includes a pair of diametrically spaced studs mounted to the underside of said disc, said bar being formed with a pair of longitudinally spaced openings adapted to receive said studs when said bar is in position against said disc.

8. A safety attachment, according to claim 7, wherein said openings are keyhole shaped.

* * * * *